Oct. 11, 1955 W. G. WING 2,720,115
CONDENSER LEVEL
Filed Nov. 8, 1949
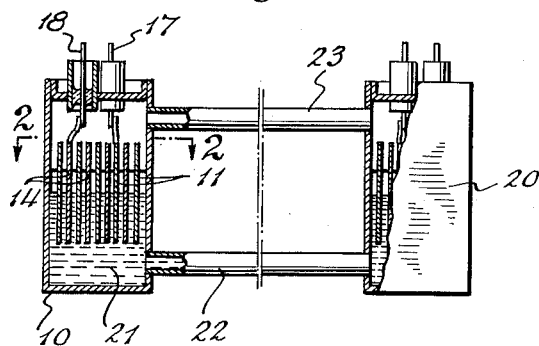
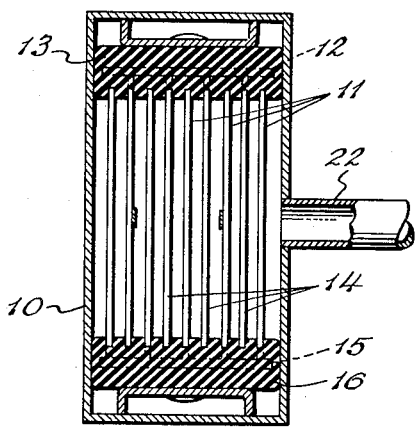
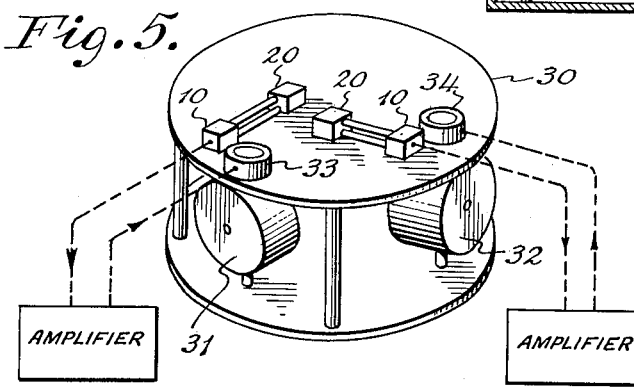
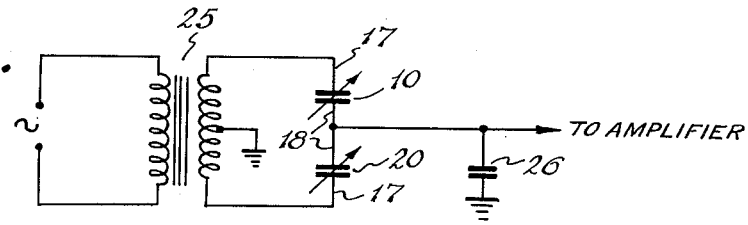
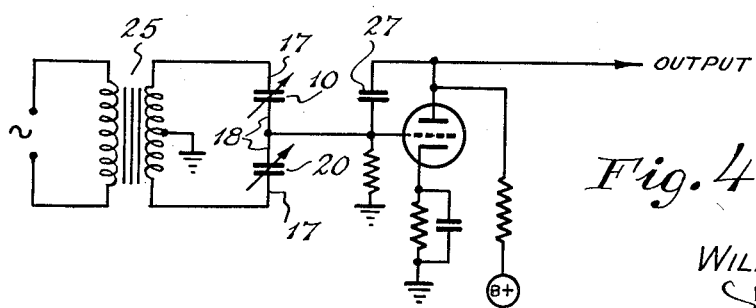
INVENTOR
WILLIS G. WING
BY
ATTORNEY United States Patent Office 2,720,115
Patented Oct. 11, 1955

2,720,115

CONDENSER LEVEL

Willis G. Wing, Roslyn Heights, N. Y., assignor to Sperry Rand Corporation, a corporation of Delaware Application November 8, 1949, Serial No. 126,207

1 Claim. (Cl. 74—5.6)

This invention relates to level references and particularly to such devices in which capacitative elements are employed to detect deviations from a level orientation.

In the fields of aeronautical and marine navigation and fire control, the need for an accurate and dependable vertical reference is well known. At present, a variety of types of level references, such as pendulous devices, spirit levels, and electrolytic levels are employed for such purpose in many applications. However, each of these devices is subject to errors inherent in their structure that limit the degree of accuracy that can be obtained. For example, in pendulous devices mounted on ball bearings, minute imperfections in the bearings prevent the return of the pendulous element to its true vertical position and cause "stand-off" errors. This type of error may be avoided by supporting the pendulous mass on a spring. However, in this type of construction the center of rotation of the mass must be extremely well defined to obtain the required uniformity of measurement. Although this can be accomplished for any given case, it is difficult to obtain spring material of such uniformity that quantities of these devices can be conveniently reproduced. Spirit levels are suitable only for applications in which the vertical is to be determined as a result of visual observation. They are not suited to applications in which automatic controls are required. Electrolytic levels are now developed to a point where they produce good results. However, in any such construction the selection of the electrolyte is an extremely critical problem in order to avoid the formation of gas bubbles and corrosion of the electrodes. Furthermore, since the sensitivity of such a device is proportional to its radius of curvature, a high degree of accuracy is difficult to obtain.

The principal object of the present invention is to improve level reference devices to avoid the difficulties inherent in known devices whereby a more accurate and dependable level indication may be obtained. This is accomplished by the use of two condenser elements so arranged that they are sensitive to tilt of the platform on which they are mounted. Specifically, this device comprises two cells or containers which are placed a short distance apart and are connected by a tube. Each cell contains a set of parallel plates with the alternate plates electrically connected to form a condenser. The cells are half-filled with a fluid which acts as the dielectric. As the level tilts, the liquid falls in one cell and rises in the other, thereby changing the capacitance of the condensers. The condensers are connected in a bridge circuit and the resulting unbalance is a measure of the tilt of the level.

A preferred form of the invention is shown in the accompanying drawings, in which:

Fig. 1 is a side elevation, partly in section, of the several elements of the invention;

Fig. 2 is a sectional view taken along the line 2—2 of Fig. 1;

Figs. 3 and 4 are circuit diagrams illustrating means to derive a tilt indication; and Fig. 5 illustrates an application of the invention as a vertical reference in a stabilization system.

Referring to Figs. 1 and 2, the condenser level includes two cells or containers 10 and 20, each having similar internal structures. In each cell a plurality of parallel plates 11 are electrically connected to a plate 12 which is mounted on an insulating block 13 fixed to the wall of the cell. Interleaved with plates 11 are a plurality of plates 14 connected to a plate 15 which is mounted on an insulating block 16 fixed to the opposite wall of the cell. Each of the blocks 13 and 16 is provided with suitable slots to support the free ends of the plates projecting from the opposite block. Plates 11 and 14 are connected respectively to leads 17 and 18 which pass through suitable seals in the cover of each cell. Each of the cells is approximately half filled with a dielectric fluid 21. Connecting the cells is a tube 22 which allows free passage of the fluid in either direction when the device is moved from a level position. A venting tube 23 permits the transfer of air from one cell to the other as the liquid level changes.

This arrangement provides two condensers which have equal capacitance when the device is in a level position. When the device is tilted, the fluid flows from the high cell to the low cell, thereby changing the capacitance of each cell. For small angles, the capacitance of the cells varies linearly with the tilt.

Obviously, the same result may be obtained if both condensers are placed in a single container. However, since the accuracy obtained is proportional to the separation of the condensers, separate cells provide a more practical arrangement.

Although any of a variety of mineral oils, vegetable oils, or organic solvents may be used as the dielectric fluid, it is preferred to use a silicone oil for this purpose. Silicone oils are uniquely suited for use in this device, first, because they have a high dielectric strength and low dielectric loss, and a high dielectric constant compared to air so that the effect of the capacitance obtained from the upper portion of each cell is negligible; second, since they are available over a wide range of viscosity, one may be selected to provide any desired degree of smoothing against random accelerations of short duration; third, they are substantially inert chemically so that they do not deteriorate the cell or plate materials; fourth, they have extremely good wetting properties so that the liquid flow relative to the plates is not impeded; fifth, they have low surface tension so that the effect of capillary rise is reduced to a minimum; sixth, they have low vapor pressure; seventh, since they are not miscible with water their dielectric properties cannot be impaired by the absorption of water during assembly. Any silicone oil having a kinematic viscosity of from one to ten thousand centistokes may be used depending on the time constant to be obtained. When the level is to be used as a vertical reference in an aeronautical application, a silicone oil having a viscosity of three centistokes is found to be most suitable.

To use this level, leads 17 are connected to the output of a center-tapped transformer 25 (see Fig. 3) which is supplied from an A.-C. source. The output signal is taken from leads 18 and is transmitted to a suitable amplifier. The voltage of this signal varies with the degree of tilt and varies in phase with the direction of tilt. Therefore, the output signal can be used to indicate the amount and sense of the tilt.

To make certain that normal variations in leakage-to-ground do not produce variations in the sensitivity of the level, the output should be loaded by an impedance that is low compared to the expected variations. If a large capacitance 26 is used for this loading impedance, the output signal will be in phase with the excitation voltage and harmonics of the excitation voltage will not be emphasized.

In certain applications, the large loading condenser 26 may be replaced by a smaller condenser 27 (see Figure 4) which is connected from the plate to the grid of the first stage of the amplifier. This has several advantages:

1. A smaller condenser is required;
2. The gain of the first amplifier stage is stabilized;
3. The output impedance of the first amplifier stage is lower.

The latter effect is particularly helpful to reduce the possibility of stray pickup if the signal is to be transmitted.

Since the cells 10 and 20 are normally sealed and contain a liquid which is an excellent dielectric, quite high exciting voltages may be used. By this means, the effect of stray voltage pickup is reduced to negligible proportions.

A typical application of this invention is illustrated schematically in Fig. 5 in which two of these levels are employed as a vertical reference for a gyro-stabilized unit of the type disclosed in copending application S. N. 124,907, filed November 1, 1949, in the names of Lisle L. Wheeler and Robert F. Garbarini. In the system disclosed in the copending application, a reference platform 30, which is suitably gimballed to permit three degrees of rotation, is gyroscopically stabilized about two axes by two horizon gyros 31, 32, which have their spin axes arranged at right angles. To provide a vertical reference for this system, two condenser levels of the type disclosed herein are arranged along perpendicular axes paralleling the normal spin axes of the gyros. These levels are each combined with a circuit such as that shown in Fig. 4 to produce signals which are amplified and applied to the associated torque motors 33 or 34 whereby precessing torques are applied to the associated gyros to cause the platform to be restored to a level orientation. If desired, the level signals may also be integrated to compensate for constant precession rates of the gyros, and other corrective signals may be added, if required.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A level reference device for determining variations from the horizontal comprising two substantially identical cells mounted in a spaced apart relationship on a common base, each of said cells comprising a fluid-tight container, an insulating block fixedly fitted therewithin, a plurality of condenser plates mounted in relatively fixed, spaced, parallel relation in said block, alternate ones of said plates being electrically interconnected, a pair of terminals mounted in and electrically insulated from one wall of said container and being connected with each interconnected set of condenser plates, a dielectric fluid partly filling each container such that said plates extend partly into said fluid, first fluid transfer means connected at the lower portion of each of said containers whereby said dielectric fluid may flow freely therebetween, a second fluid transfer means interconnecting the tops of each of said containers for the purpose of venting, and means connected with said terminals for comparing the capacitance between said condenser plates upon variations in the level of the fluid in each of said containers upon variations in the elevation therebetween.

References Cited in the file of this patent

UNITED STATES PATENTS

| | | |
|---|---|---|
| 1,007,998 | Whalton | Nov. 7, 1911 |
| 1,687,970 | Corliss | Oct. 16, 1928 |
| 1,763,806 | Methvin | June 17, 1930 |
| 2,103,741 | Bencowitz | Dec. 28, 1937 |
| 2,252,727 | Pepper | Aug. 19, 1941 |
| 2,556,838 | Caldwell | June 12, 1951 |

FOREIGN PATENTS

| | | |
|---|---|---|
| 243,318 | Great Britain | Dec. 20, 1926 |
| 614,806 | Great Britain | Dec. 23, 1948 |
| 626,217 | Great Britain | July 12, 1949 |